United States Patent [19]

Potts

[11] 4,380,793
[45] Apr. 19, 1983

[54] SUBMERSIBLE VEHICULAR LAMP ASSEMBLY

[75] Inventor: Virgil W. Potts, Cass County, Mo.

[73] Assignee: Peterson Manufacturing Co., Grandview, Mo.

[21] Appl. No.: 218,078

[22] Filed: Dec. 19, 1980

[51] Int. Cl.³ .............................................. F21V 29/00
[52] U.S. Cl. ..................................... 362/267; 362/369
[58] Field of Search ................................ 362/267, 369

[56] References Cited

U.S. PATENT DOCUMENTS

| | | |
|---|---|---|
| 2,814,720 | 11/1957 | Martin ................................. 362/267 |
| 3,017,501 | 1/1962 | Tantilinger . |
| 3,106,349 | 10/1963 | Bloodgood, Jr. . |
| 3,118,616 | 1/1964 | Magazanik . |
| 3,145,933 | 8/1964 | Dickson . |
| 3,187,171 | 6/1965 | Trautner et al. . |
| 3,222,512 | 12/1965 | Dickson . |
| 3,248,531 | 4/1967 | Dover . |
| 3,321,618 | 5/1967 | Goldbaum et al. . |
| 3,324,268 | 8/1967 | Baldwin . |
| 3,748,458 | 7/1973 | Morrison . |
| 3,858,039 | 12/1974 | Moore . |
| 3,939,337 | 2/1976 | Oda ..................................... 362/267 |
| 4,206,499 | 6/1980 | Urbanek ............................. 362/267 |

Primary Examiner—Donald P. Walsh
Attorney, Agent, or Firm—Litman, Day and McMahon

[57] ABSTRACT

A submersible vehicular lamp assembly comprises a base plate, an elastomeric lens base and a lens body. A lip member extends from lens body side walls and is snugly received within a groove formed in a surface of the elastomeric lens base to form a sealed, watertight inner cavity. A light bulb is resiliently mounted in the inner cavity to dampen the bulb from road induced vibrations, shocks and the like. Associated wiring for the lamp assembly passes through apertures in the lens base which are smaller than the thickness of the individual wires to prevent entry of water, dust, and other damaging elements.

6 Claims, 5 Drawing Figures

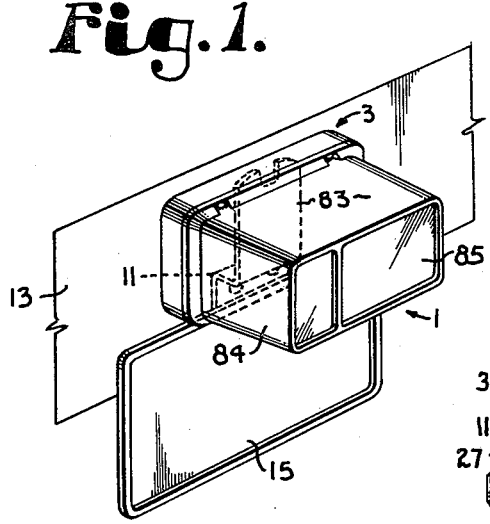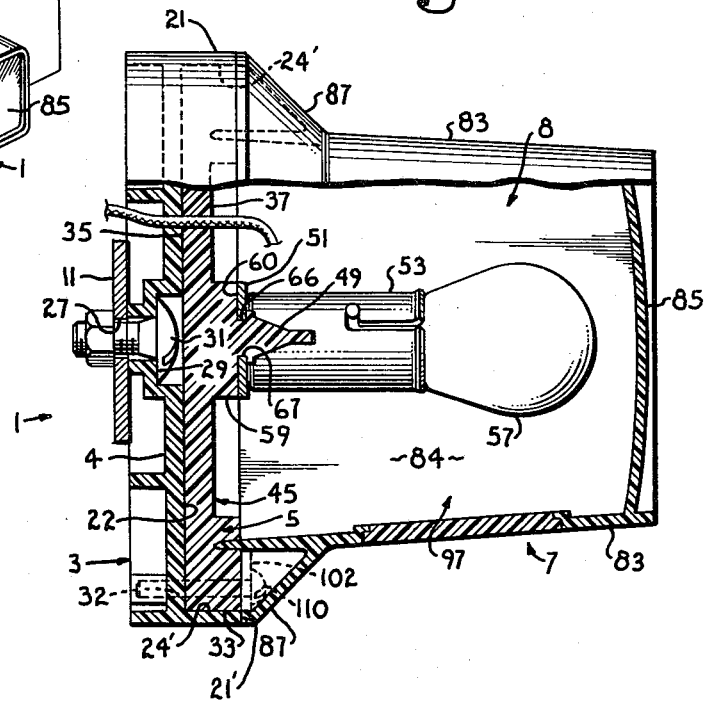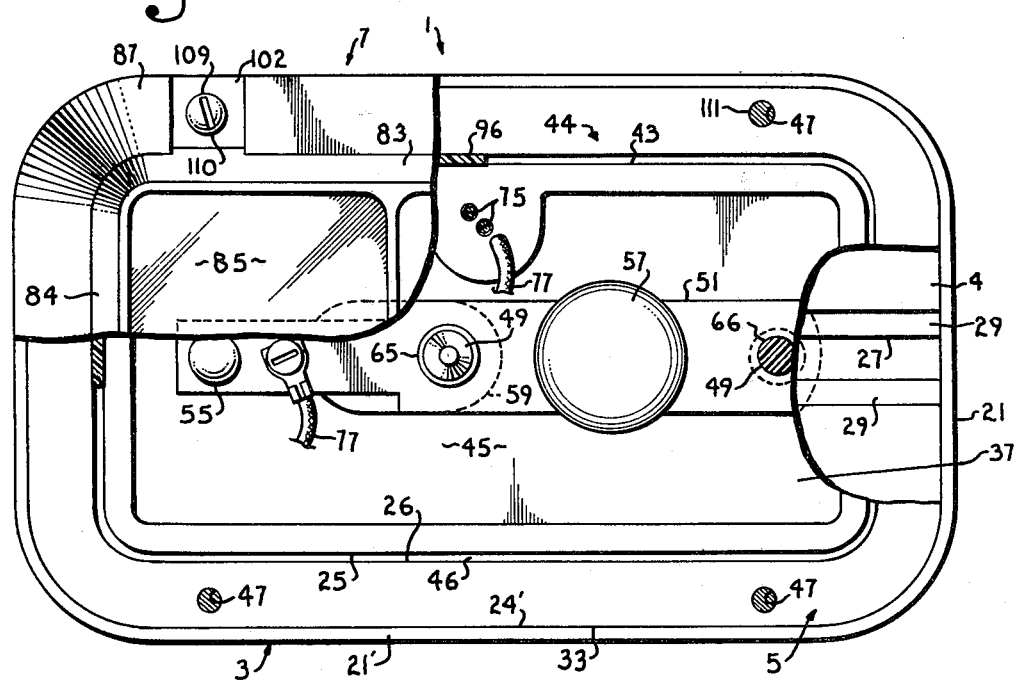

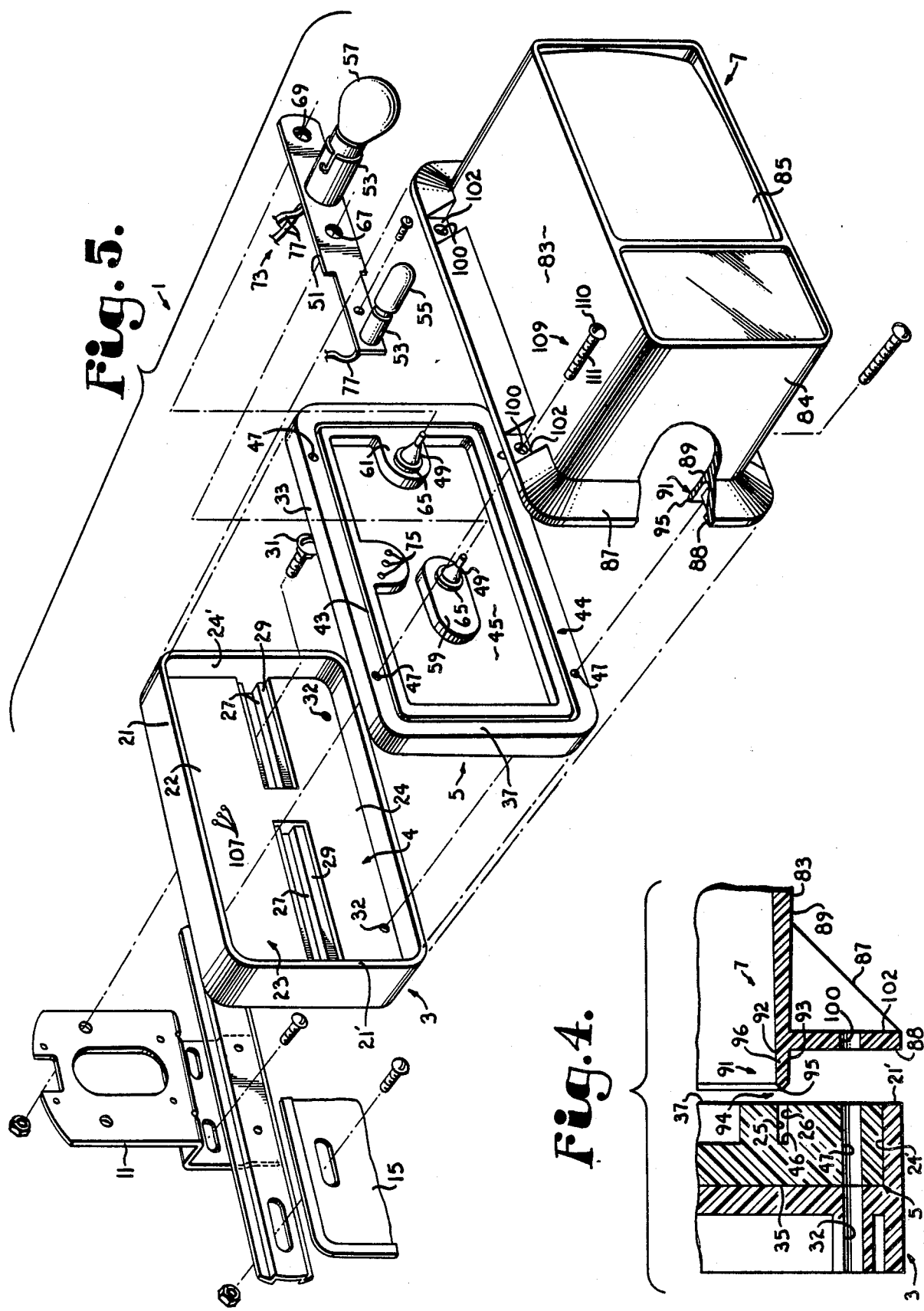

SUBMERSIBLE VEHICULAR LAMP ASSEMBLY

BACKGROUND OF THE INVENTION

This invention relates to vehicular lamp assemblies and, in particular, to vehicular lamp assemblies wherein an inner cavity thereof containing a lamp and associated connections is sealed from the elements so as to be water and weathertight.

It is often necessary in vehicular lamp assemblies that the lamp itself and associated connections be protected from contact with the elements, particularly rain and water. Entry of water could promote electrical short circuits, corrode connections and possibly shatter the bulb through thermal shock. Accordingly, it is often necessary and desirable to provide such vehicular lamp assemblies which are sealed against entry of water, dust and other damaging elements. Further, lamp assemblies utilized on such vehicles as boat trailers are often submersed in water when launching and loading a boat.

Yet another often encountered problem concerns the all too frequent breakage of vehicular lamp bulbs due to road shocks and vibrations transmitted from the associated vehicular structure to the filaments of the light bulbs. Because such vehicles as boat trailers are often poorly sprung, the breakage problem is even greater than normal.

Efforts to overcome the above problems have been made by others but these vehicular lamp units are often plagued with drawbacks. Such lamp assemblies are often provided with a seal positioned between a lens and a body portion of the lamp assembly. These seals are prone to leakage and further, when replacing burned out light bulbs, the seals are frequently damaged or misplaced. Other submersible lamp units include a pliable base portion which engages a lip of a lens portion to attempt to create a watertight seal. The lens portion often works loose from the pliable base portion, thereby permitting water to seep into and damage the assembly.

OBJECTS OF THE INVENTION

Therefore, the principal objects of this invention are: to provide a submersible vehicular lamp assembly having a watertight inner lamp receiving cavity; to provide such a lamp assembly which comprises a base plate, an elastomeric lens base and a lens body; to provide such a lens base having a continuous groove therearound, which receives and seals about a lip extending from a side wall of the lens body to provide a sealed inner cavity; to provide such a lens base which includes a means to resiliently mount an associated lamp to inhibit the transmission of shock and vibrations to the lamp unit; to further provide such an elastomeric lens base which seals about associated wiring for the lamp units to prevent entry of water, dust and the like; and to provide such a submersible vehicular lamp assembly which is easy to manufacture, simple in design, capable of extended use and particularly well adapted for its intended use.

SUMMARY OF THE INVENTION

A submersible vehicular lamp assembly comprises a substantially rigid base plate, an elastomeric lens and a lens body. The base plate is adapted to mount the lamp assembly onto a vehicular structure. The lens base preferably has an inwardly recessed groove to receive therein a lip portion of the lens body, sealing an inner cavity of the lamp assembly from entry of water, rain, dust and the like, as upon submersion. A lamp unit, such as an incandescent bulb, is positioned within the inner cavity and is resiliently suspended on the elastomeric base to inhibit the transmittal of shocks and vibrations to the lamp bulb during movement of the vehicle. Apertures extend through the elastomeric lens base and seal about associated wiring necessary for the light bulbs. The apertures in the lens base are of a diameter that is slightly smaller than the diameter of the associated wires to seal about the wires.

The drawings constitute a part of this specification and include exemplary embodiments of the present invention and illustrate various objects and features thereof.

BRIEF DESCRIPTION OF THE DRAWINGS

FIG. 1 is a perspective view of a lamp assembly embodying the present invention and adapted for mounting upon an associated vehicular structure.

FIG. 2 is a fragmentary side elevational view of the lamp assembly and showing interior details thereof.

FIG. 3 is a fragmentary, front elevational view of the lamp assembly and showing interior details thereof.

FIG. 4 is a fragmentary, enlarged view of the lamp assembly showing a connection between a lens body and a lens base thereof.

FIG. 5 is a disassembled, perspective view of the lamp assembly.

DESCRIPTION OF THE PREFERRED EMBODIMENT

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail:

The reference numeral 1 generally indicates a submersible lamp assembly embodying the present invention. As shown, the lamp assembly 1 includes a substantially rigid base member 3, an elastomeric lens base 5, and a lens body 7. The lens body 7, lens base 5, and base member 3 are connected together by a retaining means in such a manner, described below, to provide a watertight seal between the lens base 5 and lens body 7 to prevent entrance of moisture within the enclosure or inner cavity 8 of the lamp assembly 1. In the illustrated example, the lamp assembly 1 is affixed to a mounting bracket 11 which is connectible to a structure such as an associated vehicular structure 13. As shown in FIG. 1, the mounting bracket 11 may be adapted to retain a vehicular license plate 15. Although the lamp assembly 1 is shown mounted on an associated vehicular structure, the lamp assembly 1 could be used whenever a fluid-tight lamp assembly is desired.

The base member 3 includes a plate member 4, with a web portion 22, and a peripheral flange 21 extending from an outer extremity 24 thereof terminating in a flange end shoulder 21' providing an interior flange surface 24'. The web 22 and flange 21 define an interior cavity 23 for receipt of the lens base 5 as described below. Slots 27 extend through the web portion 22, and have shoulders 29 extending therealong for receipt of fasteners, such as bolts 31 or the like, to secure the lamp assembly 1 to the mounting bracket 11. The slots 27 permit universal mounting and allow the bolts 31 to be moved inwardly and outwardly relative to the base member center to connect to mounting brackets of various sizes and shapes. Bores 32, such as having threaded interior walls, extend through the base member 3 adjacent the outer extremity 24 for a purpose later described. Preferably, the base member 3 is fabricated of a rigid or semi-rigid material such as fiber reinforced plastic for rigidity, durability and lightness in weight.

The lens base 5 is generally planar and includes opposite first and second surfaces 35 and 37 connected by peripheral side walls 33. The lens base 5 fits with the interior cavity 23 of the base member 3 with the first surface 35 engaging the web portion 22 of the base plate member 4 such that base member plate 4 substantially provides a rigid or semi-rigid backing for the lens base 5. Preferably, the lens base 5 is of such a size commensurate with the base member 3 to be received within base member interior cavity 23 with the lens base side walls 33 snugly contacting the inner surface 24' of the flanges 21. Preferably, the lens base 5 is of a thickness greater than the height of the flange 21 above the web portion 22 so that, when the lens base 5 is received within the cavity 23, the second surface 37 extends slightly outwardly of the flange end shoulder 21'.

A sealing means extends between the lens base 5 and the lens body 7 and, in the illustrated example, includes a continuous groove 43 extending through the second surface 37 and about a peripheral portion 44. The groove 43 forms a boundary for an inner area 45 of the lens base 5. The groove 43 includes inner and outer wall portions 25 and 26 and terminates intermediately of the lens base first surface 35 and second surface 37 to provide a bottom portion 46. The groove wall portions 25 and 26 extend substantially normal to the lens base second surface 37.

Outwardly of the lens base inner area 45, apertures 47 extend through the lens base 5 and are positioned in alignment with the threaded bores 32.

The lens base 5 contains a means to suspend an illumination means such as incandescent light bulbs 55 and 57 thereon. The suspension means includes spaced, resilient nipples or protrusions 49 which extend outwardly from land portions 59 and 61 on the lens base inner area 45. The protrusions 49 suspend a light bulb mounting member 51 therebetween and in spaced relation from lens base second surface 37. In the illustrated example, sockets 53 receive the individual light bulb units 55 and 57 and are mounted upon the mounting member 51. The protrusions 49 are substantially conical in shape and have basal annular shoulders 65 extending radially outwardly and providing an annular recess 66 between the shoulder 65 and the respective land portion 59 or 61.

In the illustrated example, the mounting member 51 includes a bar having an interior surface 60, and spaced apertures, 67 and 69, aligned to receive the nipples or protrusions 49 so that the inner surface 60 engages the land portions 59 and 61. The mounting member 51 is urged toward the lens base 5 until the area surrounding the aperture 67 and 69 snaps past the shoulders 65 and into the respective recesses 66 whereby the shoulders 65 hold the mounting member 51 onto the lens base 5.

Suitable electrical wiring 73 is provided for the bulb units 55 and 57 to complete a circuit with a power source such as a car battery (not shown). The wiring 73 is threaded through apertures 75 extended through the lens base 5 in the inner area 43. To prevent entrance of moisture, the apertures 75 have an area or diameter which is smaller than the thickness or diameter of a wire 77 extending therethrough. The elastomeric material comprising the lens base expands to allow the wires 77 therethrough, but because of the resilient nature of the material, will snugly and interferingly engage the outer surface of the associated wires 77. Communication between the lens base 5 and the wiring 73 is sealed, thereby assuring that the lamp assembly 1 is weathertight and submersible.

Preferably, the elastomeric material of the lens base 5 is rubber-like to be soft yet sufficiently resilient to rebound and conform well to its original shape. For example, a material such as ethylylene propylene, or EPDM, having a durometer reading of between 40 and 50 is suitable. With this material, it has been found that the seal between the wires 77 and the lens base material surrounding the apertures 75 is weathertight if the apertures 75 are approximately 1/16 inch in diameter and the wires 77 are approximately 0.093 inches in diameter.

The lens body 7 has opposite side wall members 83, opposite end wall members 84, a face portion 85 and a surrounding skirt 87 which terminates in an end edge 88. The skirt 87 extends outwardly from the lens wall members 83 and 84 adjacent a peripheral margin or base portion 89 thereof. The lens body 7 further includes an inner opening 97 which is defined by inner surfaces of wall members 83 and 84 and face 85. The lens skirt 87 includes apertures 100 which are formed in recessed bosses 102, positioned around the lens 7, and are aligned with the apertures 47 in lens base 5 and the threaded bores 32 in the base plate 3. The lens face 85 may be of any suitable design such that the lamp assembly could function as any desired lamp assembly.

Extending from the lens body base portion 89 is a sealing means such as continuous lip portion 91, FIG. 4, including a web portion 96 which is adapted to be received within the lens base groove 43. The lip portion 91 has inner and outer wall surfaces 92 and 93 which snugly and sealably engage the respective groove wall portions 25 and 26. In the illustrated example, the lip portion 91 forms an extension of the side and end wall members 83 and 84; however, the lip portion 91 may be formed at any suitable location in the base portion 89 provided that alignment with the groove 43 is maintained. The ridge 91, FIG. 4, includes a beveled end 95 at an end edge 94 whereby the end 95 engages groove bottom 46. Preferably, the beveled end 95 is narrower in width than the lens base groove 43 whereas the lip web portion 96 is preferably wider than the groove 43.

In assembling the vehicular lamp assembly 1, the base plate 4 is secured to the associated mounting bracket 11. The lens base 5 is inserted into the base member cavity 23 and the associated wires 77 threaded through the apertures 107 in the base member 3. The lens body 7 is thereafter placed over the lens base 5 so that the lip portion 91 is received in the groove 43. In doing so, the beveled end 95 is urged into the groove 43. As the lens body 7 is further pushed towards the lens base 5, the groove 43 expands to accept the lip portion 91, thereby producing a tight seal therebetween.

Engagement means, such as bolts 109 or the like having a shank 111 and head 110 are operably positioned such that shanks 111 extend through the aligned apertures 100 in the lens body 7 and the apertures 47 in the lens base 5, and into the threaded bores 32 in the base plate 3. As the bolts 109 are rotated to progress the bolts into the bores 32, the head portions thereof 110 engage the bosses 102 to pull the lens body 7 to the lens base 5 and snugly engage the lip portion 91 within the groove 43. Finally, the beveled end 95 engages groove bottom 46 to perfect the seal.

To inhibit overtightening and possible damage to the seal, the lens base second surface 37 is engaged by the lens skirt 87 prior to the skirt end edge 88 contacting the base plate flange shoulder 21'. Because of the resilient material of the lens base 5, the lens base 5 slightly compresses until the skirt end edge 88 contacts the base plate flange shoulder 21'. Further excessive deformation of the lens base, and possible seal damage, is arrested by the end edge 88 abutting the flange shoulder 21'. When this occurs, the lip portion 91 has fully bottomed within the groove 43 with the beveled end 95 fully contacting the groove bottom 46. Since the groove 43 is narrower in width than lip portion 91, the groove wall portions 25 and 26 sealingly grip the surfaces of the lip portion 91 to provide a seal for the inner cavity 8 of the lamp assembly 1 and protect the light bulbs 55 and 57 and the lens base inner area 45 from moisture.

When desired to replace a bulb unit, it is only necessary to loosen the bolts 109 and remove the lens body 7 from the lens base 5. Thereafter, the bulb units can be replaced in the normal manner and the lens body 7 reinstalled onto the lens base 5. It is noted that the lens base 5 is of such construction that the removal and reinstallation of the lens body 7 thereon in no way inhibits the sealable nature of the connection between the lip 91 and groove 43.

It is to be understood that while certain embodiments of the present invention have been illustrated and described herein, it is not to be limited to the specific forms or arrangement of parts described and shown.

I claim:

1. A submersible lamp assembly comprising:
   (a) a lens body having a face and surrounding wall members defining a cavity therein, said lens body wall members terminating in a continuous lip;
   (b) a substantially planar elastomeric lens base having illumination means mounted thereon, said illumination means being operably received in said cavity, said lens base having a continuous groove extending inwarding thereof, said groove receiving said lens lip when said lens base is placed in covering relationship with said lens cavity, said lip engaging said groove in a watertight, sealable relationship; and
   (c) whereby said lens lip and lens base groove cooperate as an alignment means assuring that said lens base is positioned in proper covering relation relative to said cavity when said lip is received within said groove.

2. The lamp assembly set forth in claim 1 including:
   (a) a base member substantially backing said lens base;
   (b) said base member having an engagement means mounting said base member to said lens base and said lens body with said lens base therebetween and urged into sealing engagement with said lens body.

3. The assembly set forth in claim 2 wherein:
   (a) said lens body has a skirt extending outwardly from said wall member and positioned adjacent said peripheral margin; said skirt terminating in an end edge;
   (b) said base member includes a plate member having a web bounded by an outer extremity and with a flange portion having a shoulder edge protruding from said outer extremity and providing a cavity sized for receipt of said lens base;
   (c) said lens base being sized for receipt in said cavity and supported by said web;
   (d) said flange and said skirt being in abutting relationship with said shoulder edge engaging said skirt end edge and limiting movement of said lens body toward lens base.

4. The assembly set forth in claim 1 wherein:
   (a) said illumination means includes a light bulb and a bulb socket;
   (b) a socket support member resiliently mounted to said lens base; and
   (c) said lens base having spaced mounting posts extending outwardly thereof and engaging said socket support member.

5. The lamp assembly as set forth in claim 1 wherein:
   (a) said lens base groove includes opposed side walls and a bottom wall;
   (b) said lens lip includes side walls and an end edge; and
   (c) said walls of said lens lip spaced apart a distance slightly greater than said groove walls whereby when said lens lip is urged into said lens base groove said groove walls are resiliently urged outwardly, sealingly engaging said lip walls.

6. A submersible lamp assembly comprising:
   (a) a lens having a face and surrounding wall member, said surrounding wall member defining a cavity therein and terminating in a continuous lip;
   (b) An substantially planar elastomeric lens base adapted to be retained in covering relationship of said cavity, said lens base including a peripheral edge sealingly engaging said lens lip, and, wherein:
   (c) said lens base includes a shock inhibiting light bulb mount retaining a light bulb within said lens cavity, said mount compising two elastomeric posts extending outwardly from said lens retaining a light bulb mounting bracket therebetween having a light attached thereto, whereby said lamp assembly is provided with a watertight sealed cavity having a light bulb retained therein in a shock and vibration inhibiting fashion.

* * * * *